(12) United States Patent
Hobo et al.

(10) Patent No.: US 8,301,043 B2
(45) Date of Patent: Oct. 30, 2012

(54) LIQUID-LEVEL DETECTION DEVICE, IMAGE FORMING DEVICE, AND LIQUID CONTAINING DEVICE

(75) Inventors: Jumpei Hobo, Osaka (JP); Koji Murase, Hyogo (JP); Hiroyuki Ueda, Osaka (JP); Nobuhiro Horiuchi, Nara (JP); Hidenori Takenaka, Osaka (JP); Tomoyuki Oda, Kyoto (JP)

(73) Assignee: Kyocera Document Solutions Inc. (JP)

( * ) Notice: Subject to any disclaimer, the term of this patent is extended or adjusted under 35 U.S.C. 154(b) by 1197 days.

(21) Appl. No.: 12/124,866

(22) Filed: May 21, 2008

(65) Prior Publication Data

US 2008/0298843 A1    Dec. 4, 2008

(30) Foreign Application Priority Data

May 29, 2007   (JP) ................. 2007-141618

(51) Int. Cl.
*G03G 15/08* (2006.01)
*G03G 21/12* (2006.01)
*G03G 15/10* (2006.01)
*G01F 23/00* (2006.01)
*G01F 1/28* (2006.01)

(52) U.S. Cl. ............. 399/27; 399/35; 399/57; 399/238; 73/290 R; 73/861.75

(58) Field of Classification Search .......... 399/57, 399/237, 238; 73/861.75, 861.79, 290 R
See application file for complete search history.

(56) References Cited

U.S. PATENT DOCUMENTS 6,230,558 B1    5/2001   Miwa et al.

FOREIGN PATENT DOCUMENTS

| JP | S59-126570 A | | 7/1984 |
|---|---|---|---|
| JP | 59197820 A | * | 11/1984 |
| JP | 08254440 A | * | 10/1996 |
| JP | H09-126865 A | | 5/1997 |
| JP | H11-148851 A | | 6/1999 |
| JP | 11174814 A | * | 7/1999 |
| JP | 2000-146639 A | | 5/2000 |
| JP | 2005-077402 A | | 3/2005 |
| JP | 2006170788 A | * | 6/2006 |
| JP | 2006313322 A | * | 11/2006 |

OTHER PUBLICATIONS

Yanajima (JP 2006-313322 A, Nov. 2006) JPO Machine Translation, Nov. 2006.*

* cited by examiner

*Primary Examiner* — David Gray
*Assistant Examiner* — Erika J Villaluna
(74) *Attorney, Agent, or Firm* — Ostrolenk Faber LLP

(57) ABSTRACT

A liquid-level detection device detects the liquid level in the developer storing container for storing liquid developer, and includes a first water wheel, a first rotation detection mechanism, and first liquid-level detection device. The first water wheel is disposed in the interior of the developer storing container, and is configured to be rotated by liquid developer to be supplied to the developer storing container. The first rotation detection mechanism is configured to detect a rotation state of the first water wheel. The first liquid-level detection device detects the liquid level of liquid developer based on a result detected by the rotation detection mechanism.

13 Claims, 11 Drawing Sheets

LIQUID-LEVEL DETECTION DEVICE, IMAGE FORMING DEVICE, AND LIQUID CONTAINING DEVICE

CROSS-REFERENCE TO RELATED APPLICATIONS

This application claims priority to Japanese Patent Application No. 2007-141618, filed on May 29, 2007, the entirety of which is hereby incorporated by reference.

BACKGROUND OF THE INVENTION

1. Field of the Invention

The present invention relates to a liquid-level detection device, an image forming device including the liquid-level detection device, and a liquid containing device.

2. Background Information

An image forming device includes an image forming section for forming an image on a sheet of paper based on image information, a fixing section for fixing the image formed by the image forming section onto the sheet of paper, and a discharging section for discharging the sheet of paper on which the image is formed by the fixing section.

In the image forming device, an image is formed on a sheet of paper by the image forming section, and the formed image is fixed by the fixing section. Then, the sheet of paper on which the image is fixed is discharged from the discharging section.

Here, some image forming devices using liquid developer (i.e., mixture of toner and carrier liquid) are configured to recover and to recycle residual developer that was not used for development. In this type of image forming device, the residual developer is recovered in a storing container, and agitation and concentration regulation are performed. Then, the developer for which concentration regulation is performed is supplied to a developing device provided in the image forming section, and is reused.

In the above described image forming device, the liquid developer is supplied to the liquid storing container when the amount of the liquid developer stored in the storing container is reduced. Then, when a liquid-amount detection device detects that the amount of the developer stored in the storing container reaches to a predetermined amount, supply of the developer is stopped. An example is shown in Japanese Patent Application Publication No. JP-A-S59-126570.

In the above described liquid-amount detection device, a float is contained in the interior of the liquid storing container. The float moves up and down depending on the height position of the surface of the liquid stored in the liquid storing container. Accordingly, the liquid level is detected based on the position of the float. However, under the condition that the viscosity of the liquid is high, the height position of the float may not be elevated even when the liquid level goes up. Because of this structure, it is difficult to detect accurately whether or not the amount of the liquid stored in the liquid storing container reaches to a specified amount.

In view of the above, it will be apparent to those skilled in the art from this disclosure that there exists a need for an improved an image forming device including the liquid-level detection device, and a liquid containing device. This invention addresses this need in the art as well as other needs, which will become apparent to those skilled in the art from this disclosure.

SUMMARY OF THE INVENTION

An object of the present invention is to detect accurately whether or not the amount of liquid stored in a liquid storing container reaches a specified amount.

A liquid-level detection device according to a first aspect of the present invention is a liquid-level detection device that detects a liquid level in the liquid storing container is positioned in a predetermined position, and includes a rotator, a rotation detection mechanism, and liquid-level detection device. The rotator is disposed in the interior of the liquid storing container, and is configured to be rotated by liquid to be supplied to the liquid storing container. The rotation detection mechanism is configured to detect a rotation state of the rotator. The liquid-level detection device is configured to detect whether the liquid level in the liquid storing container is positioned in a predetermined position based on a result detected by the rotation detection mechanism.

In the liquid-level detection device of the present invention, the rotation moment is applied to the rotator by the liquid to be supplied to the interior of the liquid storing container. Here, when the liquid level is positioned in a position lower than or equal to a predetermined position, the rotator rotates, and the rotation state of the rotator is detected by the rotation detection mechanism. Then, it is detected whether the liquid level is positioned in the predetermined position based on a result detected by the rotation detection mechanism.

Here, it is detected whether the liquid level is positioned in a predetermined position when the rotator is rotated by the liquid to be supplied. Accordingly, it is possible to detect accurately whether the liquid level is positioned in a predetermined position even if the viscosity of the liquid is high. In other words, it is possible to detect whether the amount of liquid stored in the liquid storing container reaches to a specified amount.

An image forming device according to second aspect of the present invention includes an image forming section that forms an image based on image information, a liquid developer circulation device recycles liquid developer used in the image forming section, a liquid storing container that is disposed in the liquid developer circulation device and is configured to store the liquid developer to be recycled, and a liquid-level detection device. The liquid-level detection device includes a rotator, a rotation detection mechanism, and liquid-level detection device. The rotator is disposed in the interior of the liquid storing container and is configured to be rotated by liquid to be supplied to the liquid storing container. The rotation detection mechanism is configured to detect a rotation state of the rotator. The liquid-level detection device is configured to detect whether the liquid level in the liquid storing container is positioned in a predetermined position based on a result detected by the rotation detection mechanism.

In the image forming device of the present invention, an image is formed on a sheet of paper by the image forming section, and the liquid developer used in the image forming section is reused by the liquid developer circulation device. Here, it is detected by the liquid-level detection device whether the liquid level in the liquid storing container is positioned in a predetermined position.

Here, it is possible to detect accurately whether the liquid level of the liquid developer stored in the liquid storing container of the liquid developer circulation device is positioned in a predetermined position even when the viscosity of the liquid developer is high.

Furthermore, a liquid containing device according to a third aspect of the present invention is a device that is configured to store liquid, and includes a liquid storing container, a liquid supply part, a liquid outlet, a liquid channel, a pump, a rotator, a rotation detection mechanism, and liquid-level detection device. The liquid storing container is a member that stores liquid. The liquid supply part is disposed on an upper portion of the liquid storing container. The liquid outlet is disposed on a bottom portion of the liquid storing container. The liquid channel is a member that connects the liquid outlet and the liquid supply part. The pump is disposed in the liquid channel, and is configured to pump the liquid developer in the liquid outlet to the liquid supply part. The rotator is disposed in the interior of the liquid storing container, and is configured to be rotated by liquid to be supplied to the liquid storing container from the liquid supply part. The rotation detection mechanism is configured to detect a rotation state of the rotator. The liquid-level detection device is configured to detect whether the liquid level in the liquid storing container is positioned in a predetermined position based on a result detected by the rotation detection mechanism.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

An embodiment of an image forming device of the present invention will be hereinafter described with reference to the attached figures. Note that the position, the size, and so on of the members in the figures may be exaggerated for an easy-to-understand explanation. Also, in the following embodiments, a printer is exemplified as an example of the image forming device of the present invention. However, the present invention is not limited to this. Specifically, the image forming device of the present invention may be a so-called multi-function peripheral (MFP) having functions of a copier and a facsimile, or an image forming device only having a function of a copier. A specific configuration of these members to be described, and other members, may be changed as necessary.

1. Configuration 1.1 Overall Configuration

Figure 1:
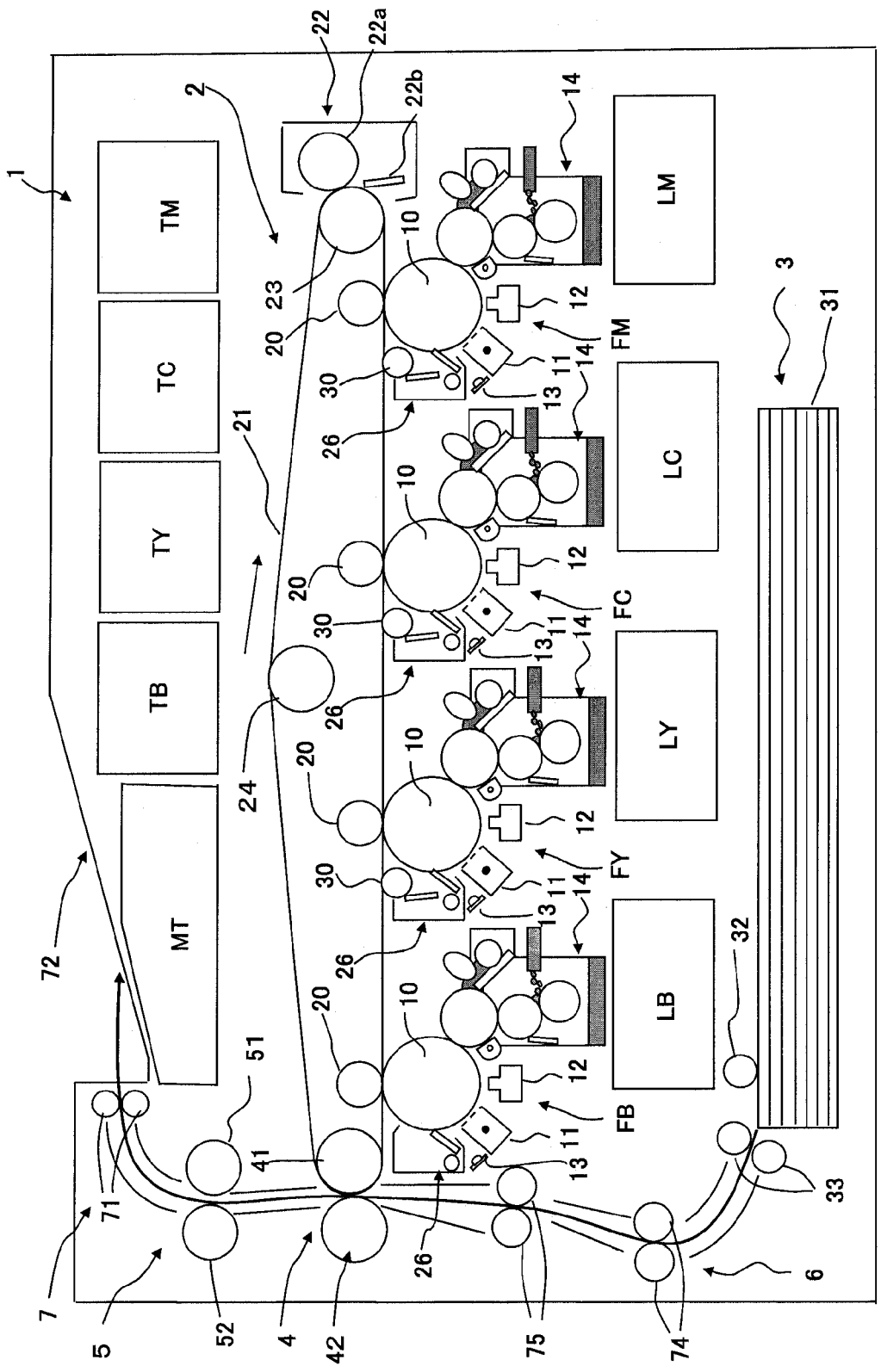
FIG. 1 is a schematic cross-sectional view of an entire configuration of a color printer in accordance with a first preferred embodiment of the present invention.

FIG. 1 illustrates a color printer 1 as an image forming device according to the first preferred embodiment of the present invention. The image forming device 1 includes an image forming section 2, a paper storing section 3, a second transfer section 4, a fixing section 5, a paper conveyer section 6, and a discharging section 7. The image forming section 2 is a tandem type image forming section to form a toner image based on image data. The paper storing section 3 stores a single or plurality of sheet(s) of paper, which is an example of recording medium. The second transfer section 4 transfers the toner image formed by the image forming section 2 onto a sheet of paper. The fixing section 5 fixes the toner image transferred onto the sheet of paper. The paper conveyer section 6 conveys a sheet of paper stored in the paper storing section 3 to the discharging section 7. The discharging section 7 discharges the sheet of paper onto which the toner image is completely fixed.

The image forming section 2 includes an intermediate transfer belt 21, a cleaning unit 22, and a plurality of image forming units FB, FY, FC, and FM.

The intermediate transfer belt 21 is preferably a conductive and endless shaped (i.e., looped) member. As indicated by arrows illustrated in FIGS. 1 and 2, the intermediate transfer belt 21 is circularly driven in the clockwise direction. The width of the intermediate transfer belt 21 is greater than the maximum width of a sheet of paper that is allowed to be used in the color printer 1. Here, the term "width" means length that is perpendicular to a direction in which a sheet of paper is conveyed. In addition, one of the surfaces of the intermediate transfer belt 21, which faces outward, is hereinafter referred to as "front surface," i.e. an outer peripheral surface, and the other surface thereof is referred to as "back surface," i.e., an inner peripheral surface. Note that the intermediate transfer belt 21 is stretched by a driving roller 41, a driven roller 23, and a tension roller 24. When the driving roller 41 rotates in accordance with the driving of a driving motor (not illustrated in the figure), the intermediate transfer belt 21 is accordingly driven. In addition, when the intermediate transfer belt 21 is driven, the driven roller 23 and the tension roller 24 are rotated in accordance with the rotation of the intermediate transfer belt 21. Note that the tension roller 24 is a member that applies appropriate tension to the intermediate transfer belt 21 for the purpose of preventing the intermediate transfer belt 21 from being loosened.

The cleaning unit 22 performs cleaning of the intermediate transfer belt 21. The cleaning unit 22 includes a cleaning roller 22a and a cleaning blade 22b.

The image forming units FB, FY, FC, and FM are disposed to be aligned in the vicinity of the intermediate transfer belt 21, and are also disposed between the second transfer section 4 and the cleaning unit 22 to clean the intermediate transfer belt 21. The image forming units FB, FY, FC, and FM respectively correspond to colors of black (Bk), yellow (Y), cyan (C), and magenta (M). Note that the arrangement of the image forming units FB, FY, FC, and FM is not necessarily limited to the above. However, the arrangement pattern described above is preferable in consideration of the impact of mixture of the colors on an image to be completed.

In addition, liquid developer circulation devices LB, LY, LC, and LM, toner tanks TB, TY, TC, and TM, and a main carrier tank MT are provided to correspond respectively to the image forming units FB, FY, FC, and FM. Accordingly, the liquid developers of the colors, respectively, are configured to be supplied and recovered. Note that the liquid developer circulation devices LB, LY, LC, and LM will be described in detail in later sections.

Figure 2:
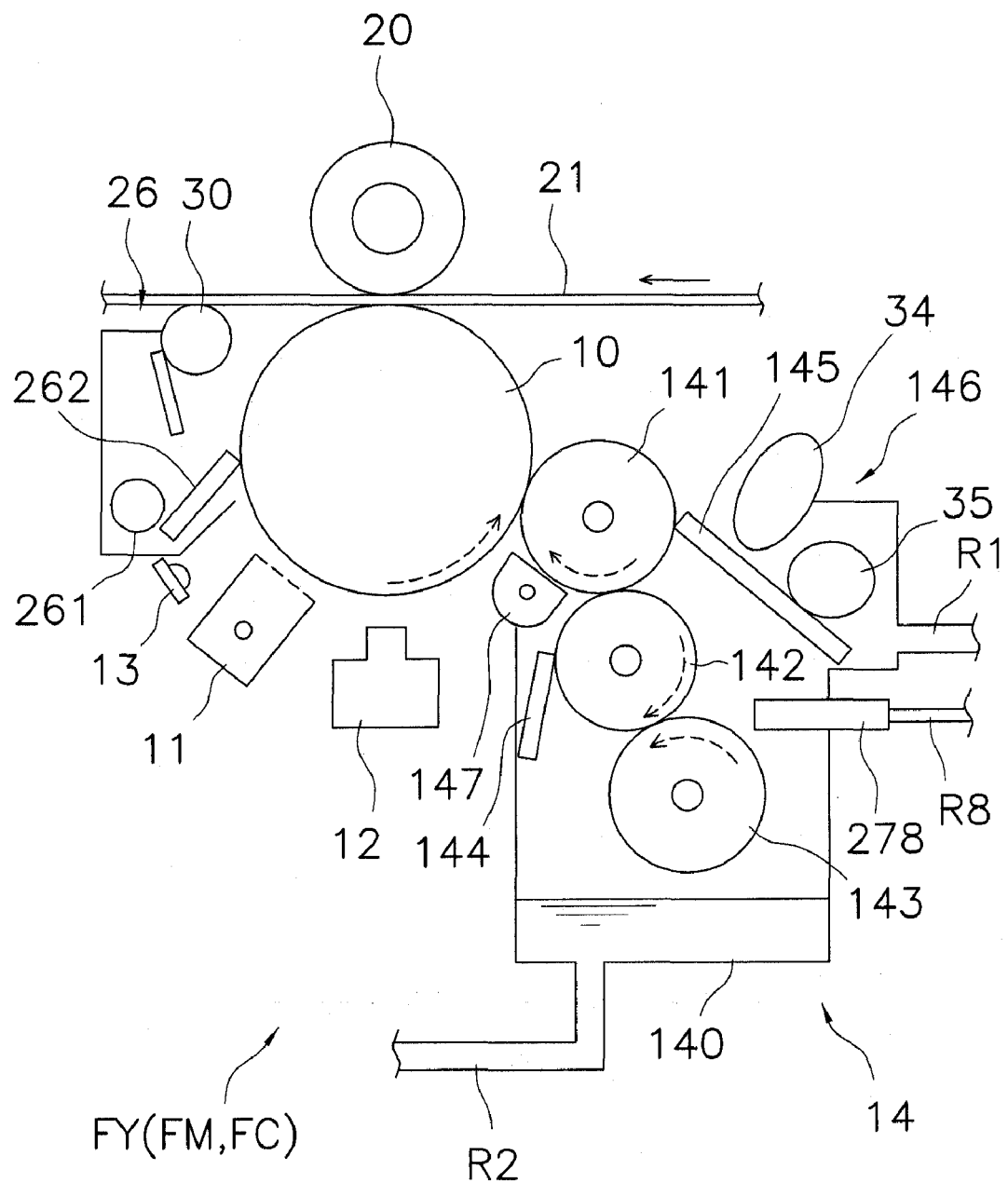
FIG. 2 is an enlarged schematic cross-sectional view of an image forming unit of the color printer.

As illustrated in FIG. 2, each of the image forming units FB, FY, FC, and FM includes a photosensitive drum 10, an electric charging device 11, an exposing device 12, a developing device 14, a first transfer roller 20, a cleaning device 26, a neutralizing device 13, and a carrier liquid removal roller 30. In addition, the carrier liquid removal roller 30 is not provided in the image forming unit FB that is disposed in a position closest to the second transfer section 4. However, the configuration of the image forming unit FB is preferably the same as the configurations of the other image forming units excluding this point.

The photosensitive drum 10 is a columnar member, and is configured to bear an electrically-charged toner image (i.e., positively-charged toner image in the present embodiment) on the surface thereof. As indicated by a dotted arrow illustrated in FIG. 2, the photosensitive drum 10 is a member that is configured to rotate in the counter-clockwise direction.

The electric charging device 11 is configured to charge uniformly the surface of the photosensitive drum 10 to have a predetermined polarity and electric potential.

The exposing device 12 includes a light source (e.g., LED), and emits light onto the surface of the uniformly-charged photosensitive drum 10 in response to the image data to be inputted from an external machine. Accordingly, electric charges are removed from the exposed portion, and an electrostatic latent image is formed on the surface of the photosensitive drum 10.

The developing device 14 holds the liquid developer including toner and carrier liquid so that the liquid developer is opposed to the electrostatic latent image formed on the surface of the photosensitive drum 10, and accordingly toner attaches to the electrostatic latent image. Consequently, the electrostatic latent image is developed as the toner image.

The developing device 14 includes a developing container 140, a developing roller 141, a supply roller 142, a support roller 143, a supply roller blade 144, a developing cleaning blade 145, a developer recovery device 146, and a developing roller electric charger 147.

The developing container 140 is a container that receives a supply of liquid developer that is made up of toner and carrier liquid. The liquid developer is supplied to the interior of the developing container 140 through a supply nozzle 278, while the ratio of the toner with respect to the carrier liquid is preliminarily regulated. This will be described in detail in the following sections. Note that the liquid developer is supplied toward a part of the support roller 143 which is in the vicinity of a nip between the supply roller 142 and the support roller 143. The residual supplied liquid developer drops below the support roller 143 and is stored at the bottom of the developing container 140. The stored liquid developer is recovered by the liquid developer circulation devices via a channel R2.

The support roller 143 is disposed approximately in or in the center of the developing container 140, and makes contact with the supply roller 142 from beneath. Thus a nip is formed between the support roller 143 and the supply roller 142. The supply roller 142 is disposed in a position obliquely upward from the support roller 143. More specifically, the supply roller 142 is disposed in a position remote from a position immediately above the support roller 143 in a direction away from the supply nozzle 278. A groove is formed on the surface of the supply roller 142 to hold the liquid developer. As indicated by dotted arrows illustrated in FIG. 2, the support roller 143 preferably rotates in the counter-clockwise direction, and the supply roller 142 preferably rotates in the clockwise direction.

The liquid developer to be supplied from the supply nozzle 278 is temporarily accumulated on the upstream side of the nip in the rotational direction of both rollers 142 and 143, and is then carried upward while held in the groove formed on the supply roller 142 in accordance with rotations of the rollers 142 and 143. The supply roller blade 144 is press-contacted with the surface of the supply roller 142, and restricts the amount of the liquid developer to be held by the supply roller 142 to a predetermined amount. The residual liquid developer scraped away by the supply roller blade 144 is accumulated on the bottom of the developing container 140. The accumulated liquid developer is recovered by the liquid developer circulation devices via the channel R2.

The developing roller 141 is disposed in an opening formed on the top of the developing container 140 so as to make contact with the supply roller 142. The developing roller 141 is preferably rotated in the same direction as the supply roller 142. In other words, in the nip in which the developing roller 141 and the supply roller 142 make contact with each other, the surface of the developing roller 141 moves in the opposite direction from the surface of the supply roller 142. Accordingly, the liquid developer held on the surface of the supply roller 142 is transferred to the surface of the developing roller 141. Here, thickness of the liquid developer layer formed on the supply roller 142 is restricted to a predetermined value. Therefore, thickness of the liquid developer layer formed on the surface of the developing roller 141 is also maintained at a predetermined value.

The developing roller electric charger 147 moves the toner included in the liquid developer layer held on the developing roller 141 to the surface side of the developing roller 141 by applying an electric field having the same polarity as that of the charged toner. Accordingly, the developing efficiency is enhanced. The developing roller electric charger 147 is disposed to be opposed to the surface of the developing roller 141 on the downstream side in a rotational direction of a contact portion between the developing roller 141 and the supply roller 142, and on the upstream side of a contact portion between the developing roller 141 and the photosensitive drum 10.

The developing roller 141 makes contact with the photosensitive drum 10, and toner is attached to a portion of the electrostatic latent image on the surface of the photosensitive drum 10, from which electric charges are removed by the exposing device 12, by the electric potential difference between the electric potential of the electrostatic latent image on the surface of the photosensitive drum 10 and a developing bias to be applied to the developing roller 141. Accordingly, a toner image in accordance with the image data is formed on the surface of the photosensitive drum 10 (developing operation).

The developing cleaning blade 145 is disposed to make contact with the surface of the developing roller 141 on the downstream side of a contact portion between the developing roller 141 and the photosensitive drum 10 in a rotational direction of the developing roller 141, and on the upstream side of a contact portion between the developing roller 141 and the supply roller 142 in the rotational direction of the developing roller 141. The developing cleaning blade 145 removes the liquid developer on the surface of the developing roller 141 that completed a developing operation with respect to the photosensitive drum 10.

The developer recovery device 146 recovers liquid developer removed by the developing cleaning blade 145, and pumps the liquid developer to a channel R1 of the liquid developer circulation devices. The liquid developer flows down along the surface of the developing cleaning blade 145. However, the developer recovery device 146 is provided with delivery rollers 34 and 35 to deliver complementarily the liquid developer because of high viscosity of the liquid developer.

The first transfer roller 20 is disposed to make contact with the back surface of the intermediate transfer belt 21 so as to be opposed to the photosensitive drum 10. Voltage having the opposite polarity from the toner included in the toner image (i.e., the polarity is "negative" in the present embodiment) is configured to be applied to the first transfer roller 20 by a power supply (not illustrated in the figure). In other words, the first transfer roller 20 applies voltage having the opposite polarity from the toner to the intermediate transfer belt 21 in a position that the first transfer roller 20 makes contact with the intermediate transfer belt 21. The intermediate transfer belt 21 has conductivity, and accordingly, the toner is attracted to the surface side of the intermediate transfer belt 21 and its periphery by the applied voltage.

The cleaning device 26 is a device that removes the liquid developer left on the photosensitive drum 10 without being transferred to the intermediate transfer belt 21, and includes a cleaning blade 262 and a conveyer screw 261.

The cleaning blade 262 is a member that scrapes away the liquid developer left on the surface of the photosensitive drum 10, and is also a plate shaped member that is formed to extend in a direction of the rotation shaft of the photosensitive drum 10. An end portion of the cleaning blade 262 slidingly makes contact with the surface of the photosensitive drum 10, and scrapes away the liquid developer left on the photosensitive drum 10 in accordance with the rotation of the photosensitive drum 10.

The conveyer screw 261 is disposed in the interior of the cleaning device 26. The conveyer screw 261 conveys the liquid developer, which is scraped way by the cleaning blade 262 and is contained in the cleaning device 26, to the outside of the cleaning device 26. In addition, the conveyer screw 261 also conveys the carrier liquid, which is removed from the intermediate transfer belt 21 by a carrier liquid removal roller 30 to be described and is then contained in the interior of the cleaning device 26, to the outside of the cleaning device 26.

The neutralizing device 13 includes a light source that removes electric charges, and removes electric charges from the surface of the photosensitive drum 10 by way of light emitted from the light source. After the liquid developer is removed from the surface of the photosensitive drum 10 by the cleaning blade 262, the neutralizing device 13 performs removal of electric charges for the next image formation.

The carrier liquid removal roller 30 is an approximately columnar member that is rotatable around a rotation shaft parallel to a rotation shaft of the photosensitive drum 10. The carrier liquid removal roller 30 rotates in the same direction as the photosensitive drum 10. The carrier liquid removal roller 30 is a member that removes the carrier liquid from the surface of the intermediate transfer belt 21, and is disposed in a position close to the side that the second transfer section 4 is disposed compared to a position in which the photosensitive drum 10 makes contact with the intermediate transfer belt 21.

The carrier liquid removed by the carrier liquid removal roller 30 is stored in the interior of the cleaning device 26.

With reference to FIG. 1 again, the paper storing section 3 is a section that stores a single or plurality of sheet(s) of paper onto which a toner image is to be fixed, and is disposed at the bottom of the color printer 1. In addition, the paper storing section 3 includes a paper feeding cassette 31 in which a single or plurality of sheet(s) of paper is stored, a paper feeding roller 32, and a pair of separation rollers 33.

The second transfer section 4 is a section that transfers the toner image formed on the intermediate transfer belt 21 onto a sheet of paper. The second transfer section 4 makes up a transfer device that transfers the toner image onto a sheet of paper together with the above described first transfer roller 20. The second transfer section 4 includes a driving roller 41 that drives the intermediate transfer belt 21, and a second transfer roller 42. The second transfer roller 42 is pressed toward the driving roller 41 while the intermediate transfer belt 21 is interposed between the second transfer roller 42 and the driving roller 41.

The fixing section 5 is a section that fixes the toner image onto a sheet of paper, and is disposed above the second transfer section 4. In addition, the fixing section 5 includes a heating roller 51 and a pressing roller 52. The pressing roller 52 is disposed to be opposed to the heating roller 51, and presses the heating roller 51.

The paper conveyer section 6 includes a plurality of pairs of conveyer rollers 74 and a pair of resist rollers 75. The paper conveyer section 6 conveys a sheet of paper from the paper storing section 3 to the second transfer section 4, the fixing section 5, and the discharging section 7. Note that only single pair of conveyer rollers 74 is illustrated in FIG. 1. However, other pairs of conveyer rollers are also preferably disposed to be aligned in a direction perpendicular to the diagram illustrated in FIG. 1, and illustration of the rollers is omitted in the figure.

The discharging section 7 is a section from which a sheet of paper, on which the toner image is transferred and fixed, is discharged. The discharging section 7 includes a plurality of pairs of discharging rollers 71 and a discharging tray 72 that is provided on the top of the color printer 1. Note that only single pair of discharging rollers 71 is illustrated in FIG. 1. However, other pairs of discharging rollers are also preferably disposed to be aligned in a direction perpendicular to the diagram illustrated in FIG. 1, and illustration of the rollers is omitted in the figure.

1.2 Configurations of Liquid Developer Circulation Devices LB, LY, LC, and LM

Figure 3:
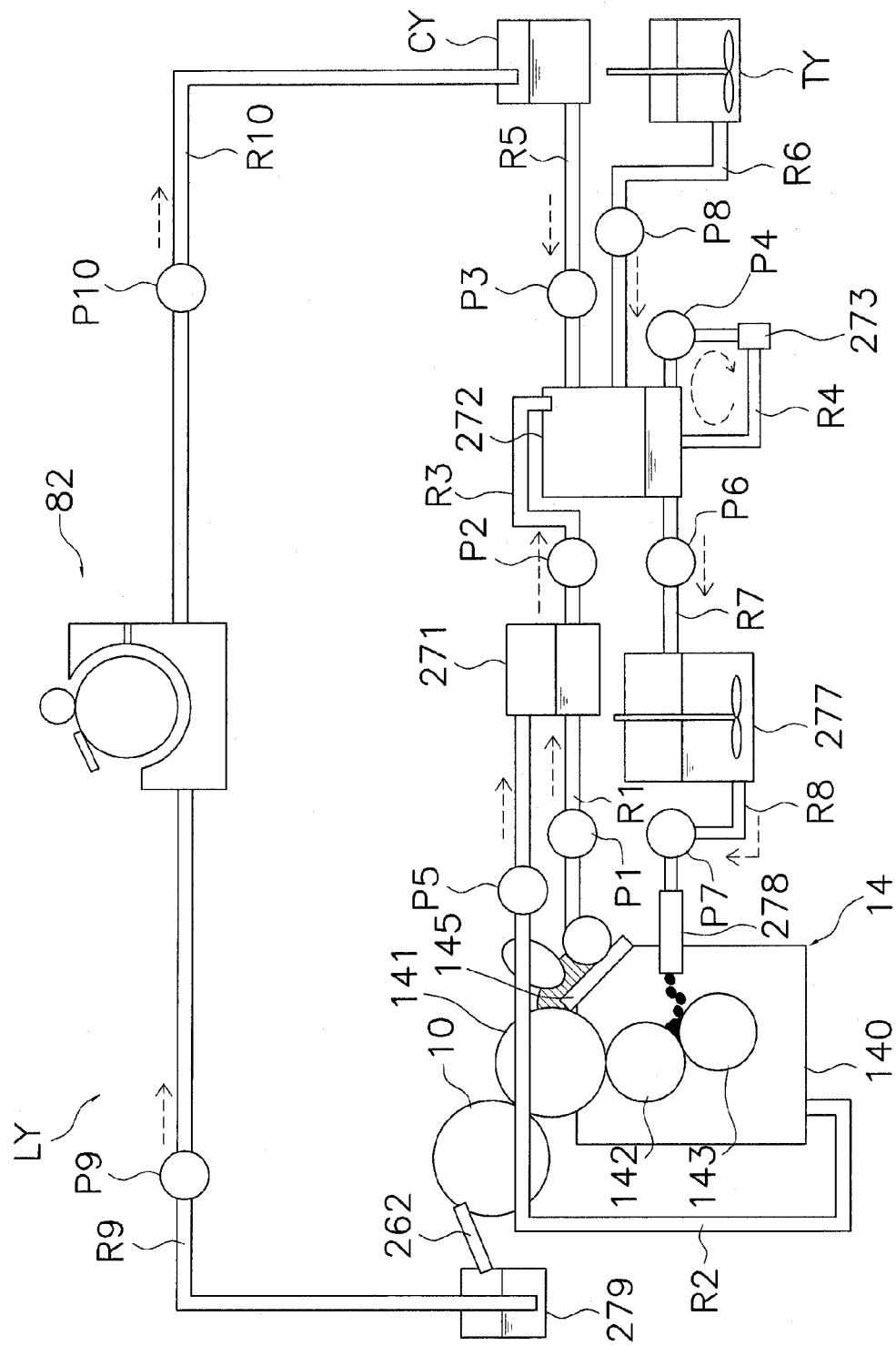
FIG. 3 is a view of a diagram illustrating a configuration of a liquid developer circulation device of the color printer.

FIG. 3 illustrates a schematic view of the entire configuration of the liquid developer circulation device LY. The liquid developer circulation device LY is a device that recycles the liquid developer by the circulation of the liquid developer. A structure of the liquid developer circulation device LY is hereinafter explained. However, the structures of the other liquid developer circulation devices LB, LC, and LM have the same or similar structure as that of the structure of the liquid developer circulation device LY. Thus, explanation of these structures will be omitted. For example, the following types of liquid developer is circulated by the liquid developer circulation device LY: the developer that is scraped away from the surface of the developing roller 141 by the developing cleaning blade 145; the developer that is not supplied from the supply roller 142 to the developing roller 141; the developer that is supplied to the support roller 143 through the supply nozzle 278 but is left as surplus developer; and the developer that is scraped away from the photosensitive drum 10 by the cleaning device 26.

The liquid developer circulation device LY includes a residual developer tank 271, a developer storing container 272 (liquid storing container), a liquid-amount detection device 28 (see FIG. 4), a solid-concentration detection device 273, a carrier tank CY, a toner tank TY, a reserve tank 277, a supply nozzle 278, a recovery container 279, a separation and extraction device 82, and a plurality of pumps P1-P10.

The residual developer tank 271 is connected to the developing device 14 by the channel R1. The residual developer tank 271 is a tank that is configured to store the developer scraped away from the surface of the developing roller 141 by the developing cleaning blade 145. The residual developer tank 271 also store the developer collected via the channel R2. In addition, the pump P1 is attached to the intermediate portion of the channel R1. The pump P1 moves the liquid developer scraped away from the surface of the developing roller 141 to the residual developer tank 271. In addition, the residual developer tank 271 is connected to the bottom of the developing device 14 by the channel R2, and the pump P5 is attached to the channel R2. The pump P5 delivers the liquid developer from the developing container 140 to the residual developer tank 271.

The developer storing container 272 is connected to the residual developer tank 271, and is a member that prepares the developer (i.e., regulating the toner concentration) to be supplied to the developing device 14. The developer storing container 272 is connected to the residual developer tank 271 by the channel R3, and the pump P2 is attached to the channel R3. The pump P2 delivers the liquid developer from the residual developer tank 271 to the developer storing container 272.

Figure 4:
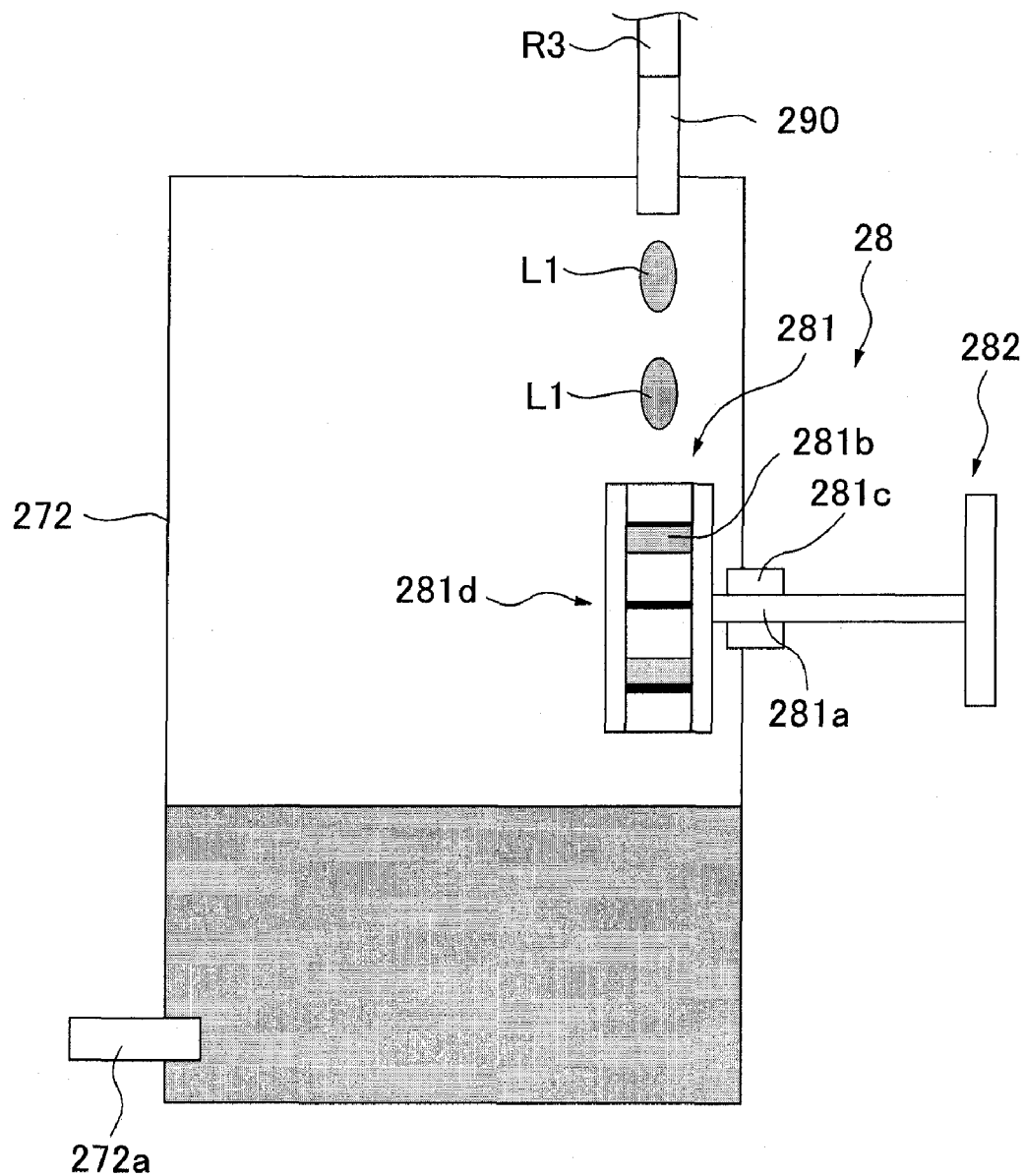
FIG. 4 is a schematic cross-sectional view of the entire configuration of a developer storing container of the liquid developer circulation device.

The liquid-amount detection device 28 (liquid-level detection device) illustrated in FIG. 4 is disposed in the interior of the developer storing container 272, and is configured to detect whether or not the liquid level of the liquid developer stored in the developer storing container 272 reaches a predetermined position. A configuration of the liquid-amount detection device 28 will be hereinafter explained in detail.

Referring again to FIG. 3, the solid-concentration detection device 273 is a device that detects concentration of the toner included in the liquid developer stored in the developer storing container 272, and is connected to an annular channel R4 that is connected to the developer storing container 272. The pump P4 is attached to the upstream side of the solid-concentration detection device 273 in the annular channel R4. The pump P4 circulates the liquid developer in the channel R4.

The carrier tank CY stores carrier liquid. The carrier liquid is used to reduce concentration of the toner stored in the developer storing container 272. In addition, the carrier tank CY is connected to the developer storing container 272 by the channel R5 to which the pump 3 is attached. The pump P3 delivers the carrier liquid from the carrier tank CY to the developer storing container 272. Note that a separate carrier tank, just like the carrier tank CY, is preferably provided in each of the other liquid developer circulation devices LB, LC, and LM, respectively. These carrier tanks receive supply of the carrier liquid from the main carrier tank MT (see FIG. 1) that is shared by all the carrier tanks. The carrier tanks and the main carrier tank MT are connected by branched pipes (not illustrated in the figure), and each of the branched pipes is exclusively used by each of all the carrier tanks. In addition, a pump (not illustrated in the figure) is attached to each of the branched pipes. When the amount of the carrier liquid in each of the carrier tanks is reduced to be less than a predetermined amount, a predetermined amount of carrier liquid is configured to be delivered from the main carrier tank MT to each of the carrier tanks.

The toner tank TY stores the liquid developer, the toner concentration of which is higher than that of the liquid developer to be used in the developing device 14. The liquid developer is used to increase the toner concentration in the developer storing container 272. The toner tank TY is connected to the developer storing container 272 by the channel R6 to which the pump P8 is attached. The pump P8 delivers the above described liquid developer from the toner tank TY to the developer storing container 272.

The reserve tank 277 is configured to store the liquid developer to be supplied to the developing device 14. The reserve tank 277 is connected to the developer storing container 272 by the channel R7 to which the pump P6 is attached. The pump P6 delivers the liquid developer from the developer storing container 272 to the reserve tank 277. In addition, the reserve tank 277 is connected to the supply nozzle 278 by the channel R8 to which the pump P7 is attached. The pump P7 delivers the liquid developer from the reserve tank 277 to the supply nozzle 278.

The supply nozzle 278 is a device that supplies the liquid developer to the developing device 14.

The recovery container 279 is a container that temporarily accumulates the liquid developer that is removed from the photosensitive drum 10 by the cleaning device 26.

The separation and extraction device 82 is a device that separates the liquid developer into the toner and the carrier liquid and extracts the toner and the carrier liquid separately. The separation and extraction device 82 is connected to the recovery container 279 by the channel R9. The pump P9 is attached to the channel R9, and the pump P9 delivers the liquid developer accumulated in the recovery container 279 to the separation and extraction device 82. The separation and extraction device 82 separates the liquid developer to be conveyed from the recovery container 279 into the toner and the carrier liquid, and extracts the toner and the carrier liquid. In addition, the separation and extraction device 82 is connected to the carrier tank CY by the channel R10. The pump P10 is attached to the channel R10, and the pump P10 delivers the carrier liquid separated from the liquid developer by the separation and extraction device 82 to the carrier tank CY.

1.3 Configuration of Liquid-Amount Detection Device 28

A configuration of a liquid-amount detection device 28 will be hereinafter explained with reference to FIG. 4. FIG. 4 illustrates an overall configuration of the liquid-amount detection device 28. The liquid-amount detection device 28 includes a first water wheel 281 (i.e., rotator), a liquid supply port 290 (i.e., liquid supply part), a first rotation detection mechanism 282, and a first control unit 283 (see FIG. 6).

The first water wheel 281 is disposed in the interior of the developer storing container 272, and is configured to be rotated by the liquid developer supplied from the liquid supply port 290 when the liquid level of the liquid developer does not reach a predetermined height position. In addition, the first water wheel 281 is attached to the developer storing container 272 at a predetermined height position, and includes a first rotary shaft 281a and a first blade member 281b. Here, the predetermined height position is a height position that the bottom portion of the first water wheel 281 equals the liquid level of the liquid developer when the liquid developer is fully stored. Note that a condition that the liquid developer is fully stored means a condition in which the supply of the liquid developer from liquid supply port 290 is required to be stopped. The first rotary shaft 281a is rotatably attached to a wall of the developer storing container 272 through a bearing 281c, and is disposed to penetrate through the wall of the developer storing container 272. The first blade member 281b is a member that rotates the first rotary shaft 281a, and is disposed in a first end 281d of the first rotary shaft 281a so as to extend radially from the first rotary shaft 281a. In addition, the first blade member 281b is disposed in the interior of the developer storing container 272, and is disposed in a position where the liquid developer (see reference numeral "L1" in FIG. 4) to be supplied from the liquid supply port 290 hits the first blade member 281b. Note that the liquid supply port 290 is provided on an upper portion of the developer storing container 272, and is connected to the channel R3 (see FIG. 3) to which the pump 2 is attached. In addition, a liquid developer outlet 272a is formed on a bottom portion of the developer storing container 272, and is configured to discharge the liquid developer toward the reserve tank 277 through the channel R7 to which the pump P6 is attached (see FIG. 3).

Figure 5:
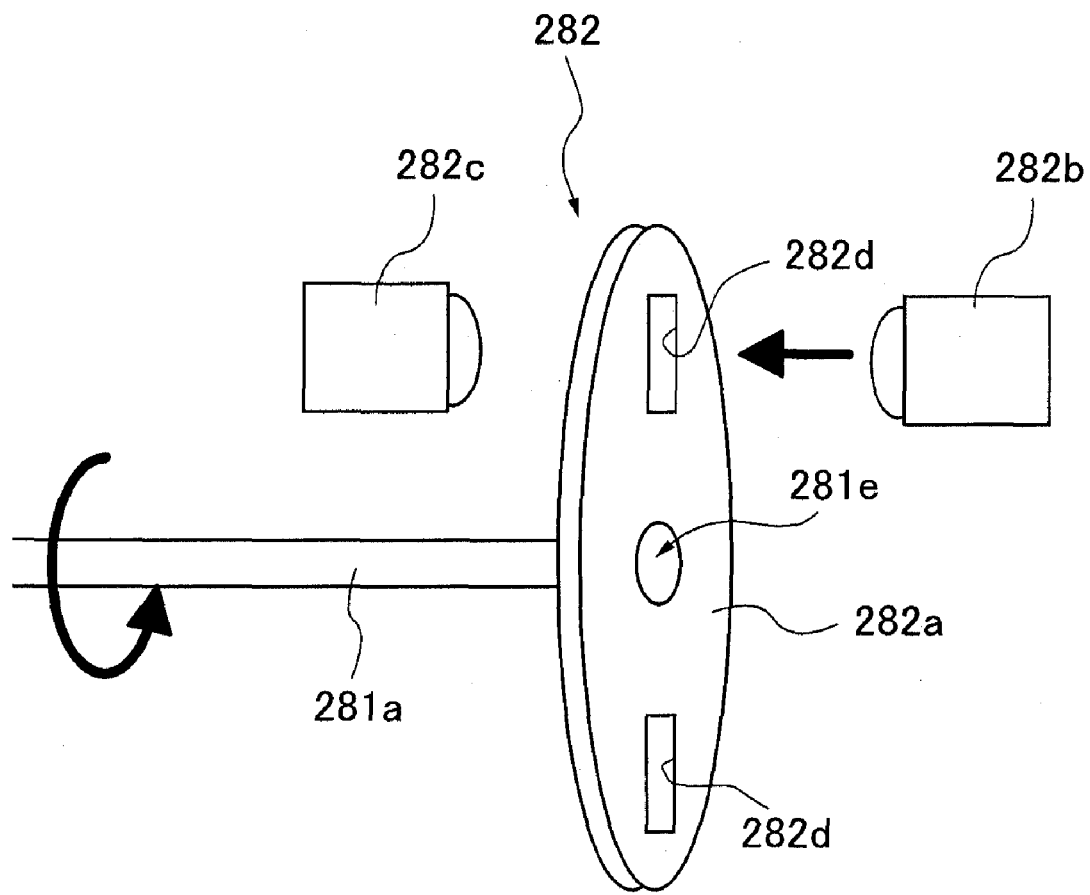
FIG. 5 is a schematic view illustrating a rotation detection mechanism of the developer storing container.

Next, a configuration of the first rotation detection mechanism 282 will be explained with reference to FIG. 5. FIG. 5 illustrates an overall configuration of the first rotation detection mechanism 282. The first rotation detection mechanism 282 is a member that is configured to detect rotation of the first water wheel 281, and includes a first disk 282a, a first light-emitting member 282b, and a first light-receiving member 282c. The first disk 282a is provided in a second end 281e of the first rotary shaft 281a. Two slits 282d are formed in the first disk 282a so as to extend in a radial direction of the first disk 282a. The first light-emitting member 282b is a member that is configured to emit light toward the first disk 282a, and includes a LED, for instance. The first light-receiving member 282c is a member that is configured to receive light emitted by the first light-emitting member 282b. The first light-receiving member 282c is disposed to be opposed to the first light-emitting member 282b while the first disk 282a is interposed between the first light-emitting member 282b and the first light-receiving member 282c. Note that the first light-emitting member 282b and the first light-receiving member 282c are disposed so that a virtual line connecting the first light-emitting member 282b and the first light-receiving member 282c is positioned to be perpendicular to the surface of the first disk 282a. Furthermore, the first light-emitting member 282b and the first light-receiving member 282c are provided so that the virtual line connecting the first light-emitting member 282b and the first light-receiving member 282c crosses the slits 282d when the first disk 282a rotates.

Figure 6:
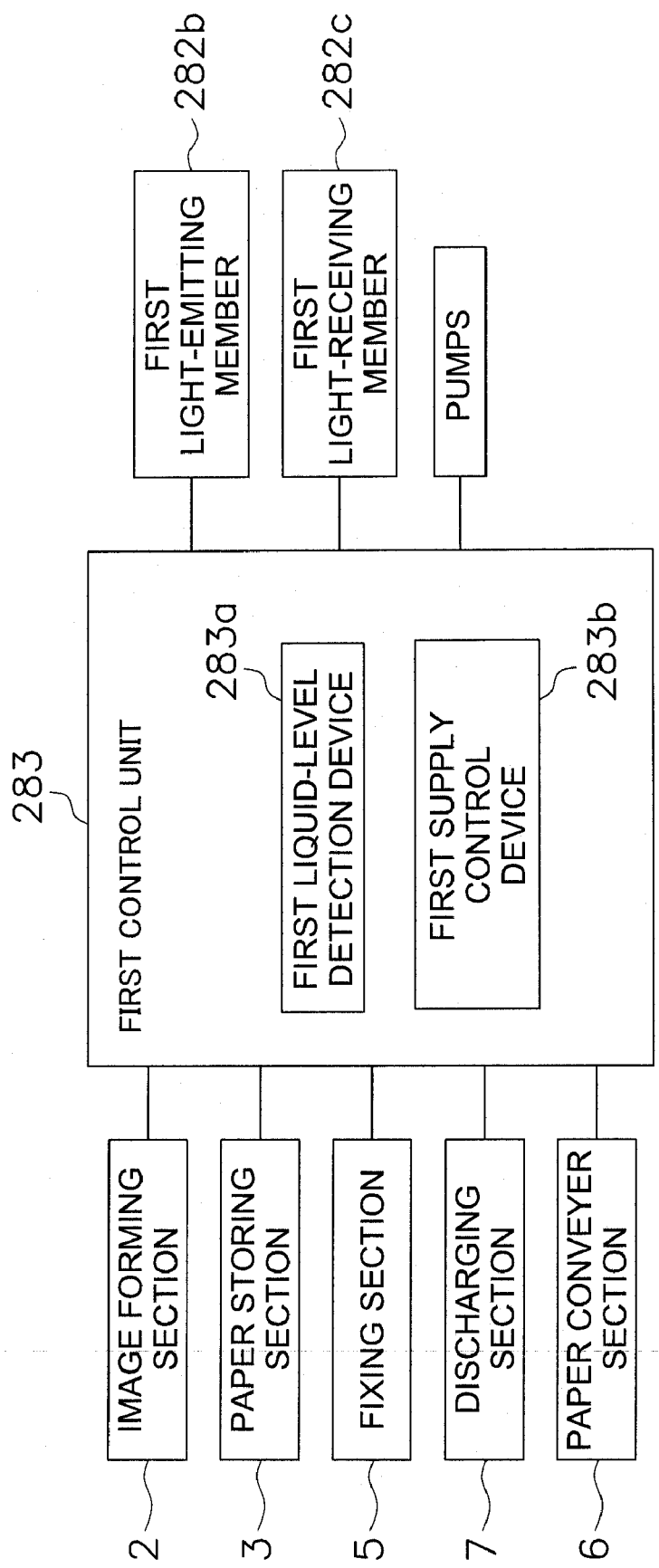
FIG. 6 is a view of a block diagram illustrating a first control unit and other components of the color printer.

As illustrated in FIG. 6, the first control unit 283 is a unit that controls the pumps, the first light-emitting member 282b, the first light-receiving member 282c, and the like. The first control unit 283 is connected to the pumps, the first light-emitting member 282b, and the first light-receiving member 282c. In addition, the first control unit 283 includes first liquid-level detection device 283a and first supply control device 283b. The first liquid-level detection device 283a detects whether the liquid level of the liquid developer is positioned in a predetermined position by the light received by the first light-receiving member 282c. The first supply control device 283b stops supply of the liquid developer from the liquid supply port 290 when the first liquid-level detection device 283a detects that the liquid level is positioned in a predetermined position.

Specifically, referring to FIGS. 4-6, it is possible to detect that the liquid level of the liquid developer does not reach a predetermined position when the first light-receiving member 282c is capable of intermittently receiving light emitted by the first light-emitting member 282b during rotation of the first disk 282a. On the other hand, it is possible to detect that the liquid level of the liquid developer reaches a predetermined position when the first light-receiving member 282c is not capable of receiving light emitted by the first light-emitting member 282b or is capable of continuously receiving light for a predetermined period of time or more. For example, in this embodiment the period of time is set to about 0.5 second. In other words, when the liquid developer is supplied from the liquid supply port 290 to the developer storing container 272, the liquid developer drips and hits the first blade member 281b. Accordingly, the rotation moment to rotate the first rotary shaft 281a is applied to the first blade member 281b. Here, when the liquid level does not reach a predetermined position, the first rotary shaft 281a rotates and accordingly the first disk 282a is rotated. Due to this, light emitted by the first light-emitting member 282b intermittently passes through the slits 282d, and is received by the first light-receiving member 282c. On the other hand, when the liquid level of the liquid developer reaches a predetermined position, the first blade member 281b is soaked in the liquid developer stored in the developer storing container 272. Accordingly, even when the liquid developer hits the first blade member 281b, the first blade member 281b does not move because of resistance applied to the first blade member 281b by the liquid developer. Consequently, the first rotary shaft 281a does not rotate and accordingly the first disk 282a does not rotate. Due to this, the state of the first disk 282a is not changed. Here, when light emitted by the first light-emitting member 282b is not capable of passing through the slits 282d, the light is not continuously received by the first light-receiving member 282c for a predetermined period of time or more. On the other hand, when light emitted by the first light-emitting member 282b passes through the slits 282d, the light is continuously received by the first light-receiving member 282c for a predetermined period of time or more. Then, a signal for indicating completion of detection of the liquid level is transmitted from the first liquid-level detection device 283a to the first supply control device 283b. Accordingly the first supply control device 283b stops pump P2 (see FIG. 3) When the liquid level of the liquid developer reaches a predetermined position, the pump P2 (see FIG. 3) is deactivated, and supply of the liquid developer from the liquid supply port 290, that is, supply of the liquid developer from the residual developer tank 271 is stopped.

2. Operation 2.1 Image Forming Operation

First, based on FIGS. 1 and 2, an image forming operation of the color printer 1 will be hereinafter explained. When the color printer 1 receives an instruction to form an image from a personal computer (not illustrated in the figure) that is connected to the color printer 1, the color printer 1 forms toner images of variety of colors, which correspond to the received data of the image formation instruction, with the image forming units FB, FY, FC, and FM. Specifically, electrostatic latent images are formed on the surface of the photosensitive drums 10 based on the image data, and toner is supplied to the electrostatic latent images from the developing device 14. The toner images that are thus created by the image forming units FB, FY, FC, and FM are transferred to the intermediate transfer belt 21, and are overlapped with each other on the intermediate transfer belt 21. Accordingly, a color toner image is formed.

In synchronization with the formation of the color toner images, a sheet of paper, which is stored in the paper feeder cassette 31 of the paper storing section 3, is taken out of the paper feeder cassette 31 by the paper feeder roller 32, and a sheet of paper is delivered to the paper conveyer section 6 by the pair of separation rollers 33 on a one-by-one basis. The sheet of paper is delivered to the pair of resist rollers 75 by a plurality of pairs of conveyer rollers 74 of the paper conveyer section 6. The posture of the sheet of paper is corrected and is temporarily stopped moving by the pair of resist rollers 75. Then, the sheet of paper is delivered into the second transfer section 4 from the pair of resist rollers 75 in synchronization with the timing of the first transfer to the intermediate transfer belt 21, and the second transfer of the color toner image on the intermediate transfer belt 21 is performed with respect to the sheet of paper by the second transfer section 4. The sheet of paper onto which the color toner image is transferred is delivered to the fixing section 5, and the color toner image is fixed onto the sheet of paper by the actions of heat and pressure.

The sheet of paper onto which the color toner image is fixed is further delivered to the discharging section 7, and is discharged to the discharging tray 72 that is provided in the outside of the color printer 1 by a plurality of pairs of discharging rollers 71.

After the second transfer is completed, the liquid developer left on the intermediate transfer belt 21 is removed by the cleaning roller 22a and the cleaning blade 22b of the cleaning section 22.

2.2 Circulation Operation of Liquid Developer

Next, an operation of supplying liquid developer to the developing device 14, that is, a circulation operation of liquid developer, will be hereinafter explained based on FIG. 3.

The liquid developer left on the developing roller 141 without being supplied to the photosensitive drum 10 during the image forming operation is scraped away by the developing cleaning blade 145, and is delivered to the residual developer tank 271 via the channel R1 by the action of the pump P1. In addition, the liquid developer received by the developing container 140 is also delivered to the residual developer tank 271 via the channel R2 by the action of the pump P5. Then, when the developer storing container 272 runs out of all the liquid developer, the liquid developer is supplied to the developer storing container 272 from the residual developer tank 271 via the channel R3 by the action of the pump P2. Also, the liquid developer left on the photosensitive drum 10 without being transferred to the intermediate transfer belt 21 is scraped away by the cleaning blade 262 and is stored in the recovery container 279.

The liquid developer recovered in the recovery container 279 is conveyed to the separation and extraction device 82 via the channel R9 by the action of the pump P9. Then, a separation and extraction processing of toner and carrier liquid from the liquid developer is performed by the separation and extraction device 82. The carrier liquid extracted by the separation and extraction device 82 is delivered to the carrier tank CY via the channel R10 by the action of the pump P10.

On the other hand, concentration of toner included in the liquid developer stored in the developer storing container 272 is detected by the solid-concentration detection device 273, and concentration regulation of the liquid developer in the developer storing container 272 is performed. Here, when the toner concentration is higher than a predetermined criterion range, the carrier liquid is supplied to the developer storing container 272 from the carrier tank CY via channel R5 by the action of the pump P3. On the other hand, when the toner concentration is lower than a predetermined criterion range, the liquid developer, the toner concentration of which is higher than that of the liquid developer to be used in the developing device 14, is supplied from the toner tank TY to the developer storing container 272 via the channel R6 by the action of the pump P8.

Then, the liquid developer for which concentration regulation is performed, is supplied from the developer storing container 272 to the reserve tank 277 via the channel R7 by the action of the pump P6 as necessary. Then, the liquid developer stored in the reserve tank 277 is delivered to the supply nozzle 278 via the channel R8 by the action of the pump P7, and is then supplied to the developing device 14 from the supply nozzle 278.

As described above, the liquid developer left on the developing roller 141 without being supplied to the photosensitive drum 10 during the image formation operation is scraped away by the developing cleaning blade 145, and is then delivered to the residual developer tank 271 via the channel R1. Then, when the amount of the liquid developer in the developer storing container 272 is used up, the residual developer is supplied from the residual developer tank 271 to the developer storing container 272.

Figure 7:
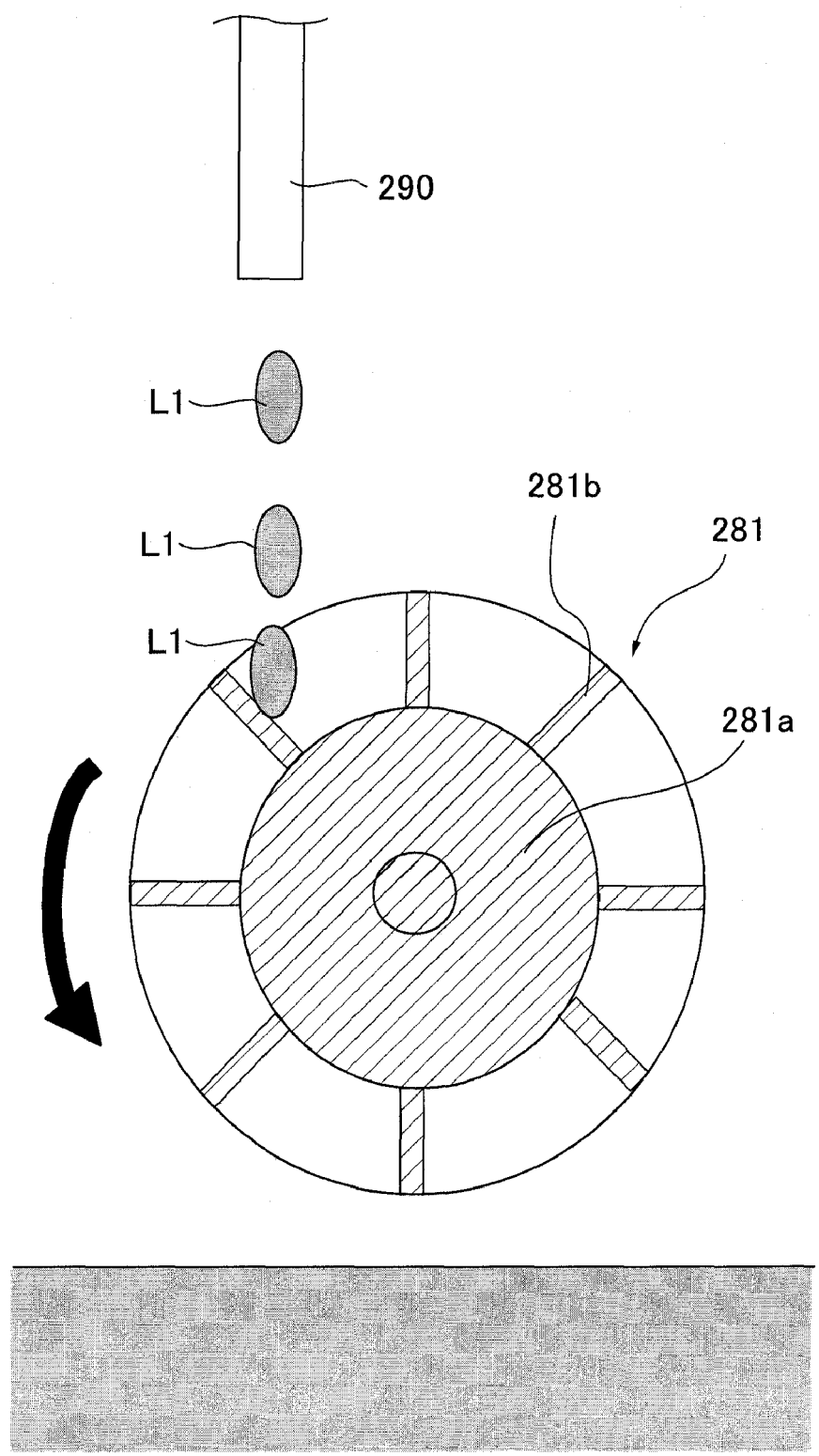
FIG. 7 is a view of a diagram illustrating a condition in which a water wheel of the developer storing container is rotated by liquid supplied from a liquid supply port.
Figure 8:
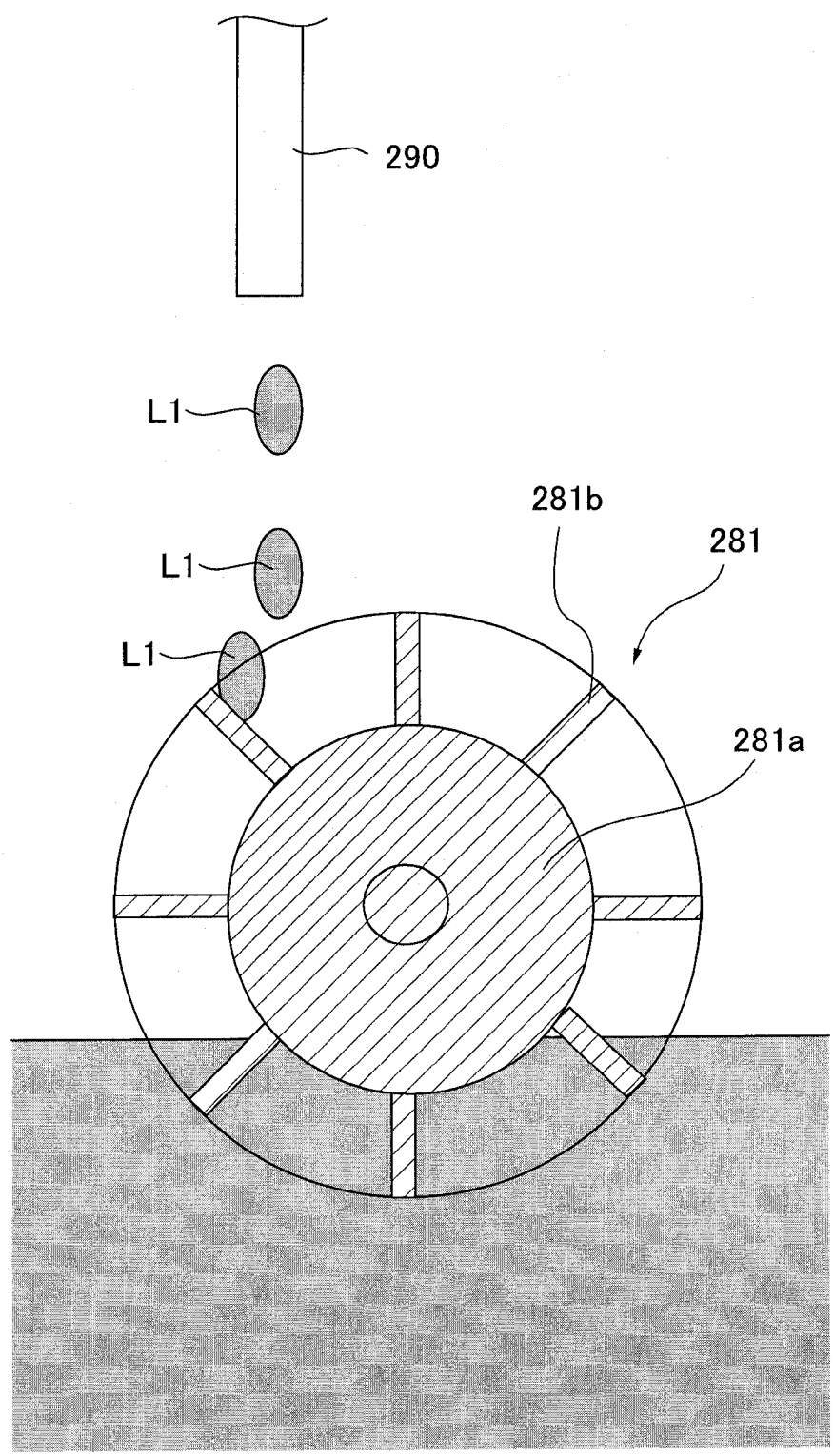
FIG. 8 is a diagram of the water wheel and its surroundings under a condition in which the amount of liquid reaches a predetermined amount.

Specifically, referring to FIGS. 3 and 4, the pump P2 is driven by the first control unit 283, and the liquid developer in the residual developer tank 271 is supplied to the developer storing container 272 via the channel R3. Here, the liquid developer is supplied from the liquid supply port 290 that is connected to the channel R3 so as to hit the first blade member 281b. Here, the first rotary shaft 281a is rotated until the liquid level of the liquid developer reaches a predetermined position (see FIG. 7). Then, light emitted by the first light-emitting member 282b is intermittently received by the first light-receiving member 282c in accordance with the rotation. On the other hand, when the liquid level of the liquid developer reaches a predetermined position, the first rotary shaft 281a stops rotating (see FIG. 8). Here, when the first water wheel 281 stops rotating under the condition that light emitted by the first light-emitting member 282b is not capable of passing through the slits 282d, and light emitted by the first light-emitting member 282b is not continuously received by the first light-receiving member 282c for a predetermined period of time or more. On the other hand, when the first water wheel 281 stops rotating under the condition that light emitted by the first light-emitting member 282b is capable of passing through the slits 282d, light emitted by the first light-emitting member 282b is received by the first light-receiving member 282c for a predetermined period of time or more. In this case, when the first supply control device 283b decides that the first light-receiving member 282c continuously receive or does not receive light for a predetermined period of time or more, the first supply control device 283b deactivates the pump P2, and thus stops supply of the liquid developer from the liquid supply port 290. Note that developer in the developer storing container 272 is stirred all the time by a stirring member (not shown) in the developer storing container 272.

After this, concentration of the toner included in the liquid developer stored in the developer storing container 272 is detected by the solid-concentration detection device 273. When the toner concentration is higher than a predetermined criterion range in the developer storing container 272, the carrier liquid is supplied to the developer storing container 272 from the carrier tank CY. On the other hand, when the toner concentration is lower than a predetermined criterion range in the developer storing container 272, the liquid developer with high toner concentration is supplied to the developer storing container 272 from the toner tank TY. Then, after it is confirmed by the solid-concentration detection device 273 that concentration regulation is completed for the liquid developer stored in the developer storing container 272, the regulated liquid developer stored in the developer storing container 272 is supplied to the reserve tank 277 as necessary.

In addition, the liquid developer stored in the reserve tank 277 is supplied to the developing device 14 through the supply nozzle 278 as necessary.

Here, it is detected whether the liquid level of the liquid developer reaches a predetermined position when the first water wheel 281 is rotated by the liquid developer supplied from the residual developer tank 271. Due to this, it is possible to detect accurately whether the liquid level of the liquid developer reaches a predetermined position even when the viscosity of the liquid developer is high. In other words, it is possible to detect accurately whether or not the amount of the liquid stored in the developer storing container 272 reaches a predetermined amount.

Second Embodiment

A second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

1. Configuration

Figure 9:
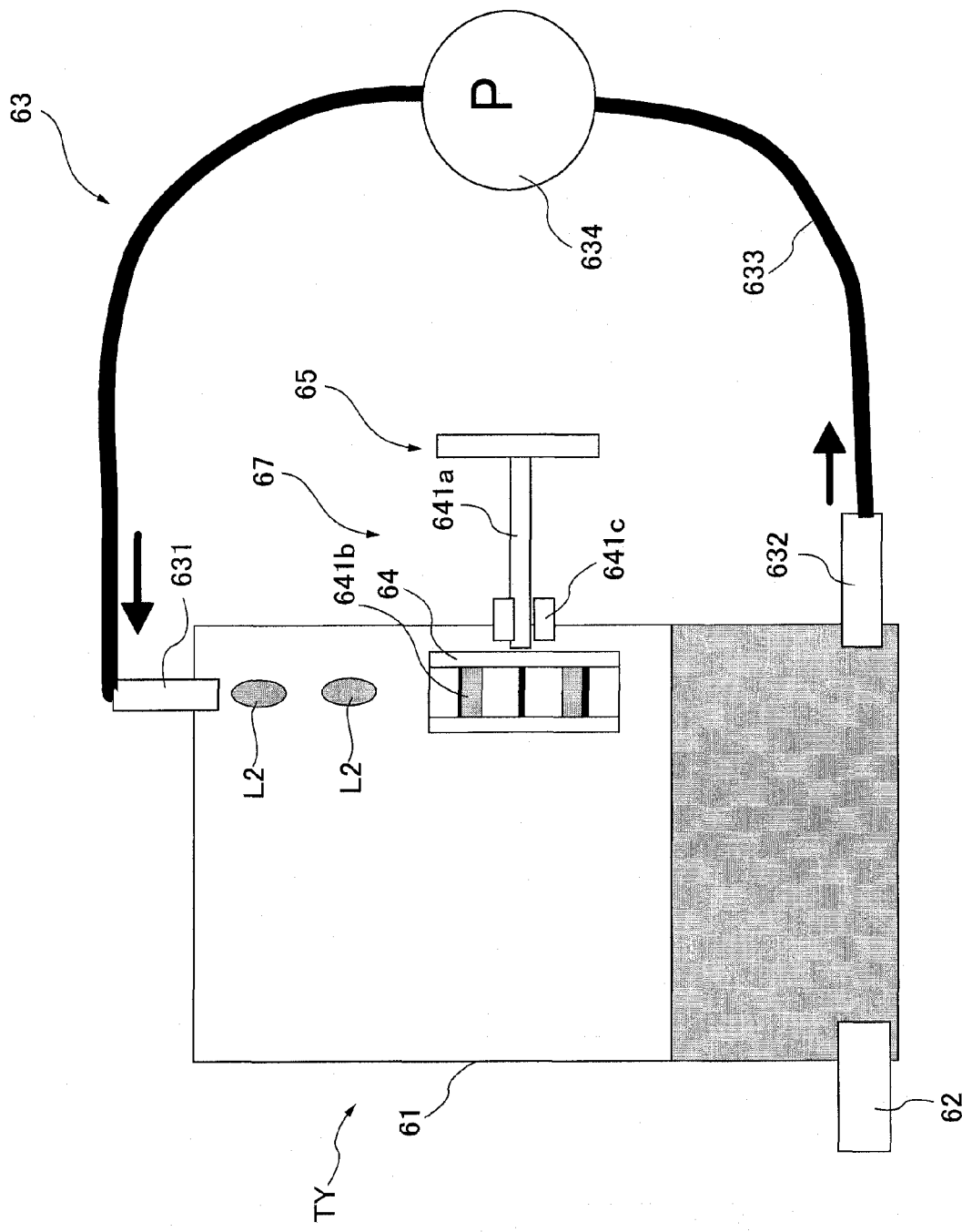
FIG. 9 is an overall view of a toner tank in accordance with a second preferred embodiment of the present invention.

The image forming device of the second embodiment differs with the first embodiment almost exclusively or exclusively with regards to the toner tank. Thus, description will focus mostly on the differences between the first and second embodiments. FIG. 9 illustrates a configuration of the toner tank TY (liquid containing device) to which a second preferred embodiment of the present invention is applied. As described above, the toner tank TY is configured to store the liquid developer, the toner concentration of which is higher than that of the liquid developer to be used in the developing device 14, in the interior thereof, and is configured to supply the liquid developer to the developing device 14 (see FIG. 3). The toner tank TY includes a toner tank main body 61 (i.e., liquid storing container), an outlet 62, a liquid supply device 63, a second water wheel 64 (i.e., rotator), a second rotation detection mechanism 65, and a second control unit 66 (see FIG. 11). Here, the second water wheel 64, the second rotation detection mechanism 65, and the second control unit 66 make up a second liquid-level detection device 67. In this case, the second liquid-level detection device 67 is a device that detects that the liquid developer in the toner tank TY is consumed and accordingly the liquid level of the liquid developer becomes lower than a predetermined height. In other words, detection of the liquid level of the liquid developer is performed to inform a user that the amount of the liquid developer in the toner tank TY is reduced to be less than a predetermined amount and exchange of the toner tank TY is necessary.

The toner tank main body 61 is a container having a space in the interior thereof, and the space is configured to store the liquid developer. The cross-section of the toner tank main body 61, which is perpendicular to the figure, is formed in a rectangular shape.

The outlet 62 is a part that supplies the liquid developer stored in the toner tank main body 61 to the developer storing container 272. The outlet 62 is disposed in a bottom portion of the toner tank main body 61.

The liquid supply device 63 is a device that supplies the liquid developer to the interior of the toner tank main body 61. The liquid supply device 63 includes a liquid supply port 631 (i.e., liquid supply part), a liquid suction port 632 (i.e., liquid outlet), a tube 633 (i.e., liquid channel), and a pump 634. The liquid supply port 631 is attached to an upper surface of the toner tank main body 61, and is a part that supplies the liquid developer toward the second water wheel 64. The liquid suction port 632 is disposed in a bottom portion of the toner tank main body 61, and is a part that suctions the liquid developer stored in the bottom part of the toner tank main body 61. The tube 633 is a part that connects the liquid suction port 632 and the liquid supply port 631. The pump 634 is preferably disposed in the intermediate part of the tube 633, and is a member that performs a series of action of suctioning the liquid developer through the liquid suction port 632, pumping the suctioned liquid developer to the liquid supply port 631, and supplying the pumped liquid developer toward the second water wheel 64.

The second water wheel 64 is disposed in the interior of the toner tank main body 61, and is a member that is configured to be rotated by the liquid developer when the liquid level of the liquid developer is lower than a predetermined height. In addition, the second water wheel 64 is attached to the toner tank main body 61 at a predetermined height position, and includes a second rotary shaft 641a and a second blade member 641b. Here, the predetermined height position is the height position of the bottom portion of the second blade member 641b, which corresponds to the liquid level of the liquid developer having the amount for which exchange of the toner tank TY is set to be performed. The second rotary shaft 641a is rotatably attached to a wall of the toner tank main body 61 through a bearing 641c, and is disposed to penetrate through the wall of the toner tank main body 61. The second blade member 641b is a member that rotates the second rotary shaft 641a, and is provided in an end of the second rotary shaft 641a so as to extend radially from the second rotary shaft 641a. The second blade member 641b is disposed in the interior of the toner tank main body 61, and is disposed in a position where the liquid developer (see reference numeral "L2" in FIG. 9) to be supplied from the liquid supply port 631 hits the second blade member 641b.

Figure 10:
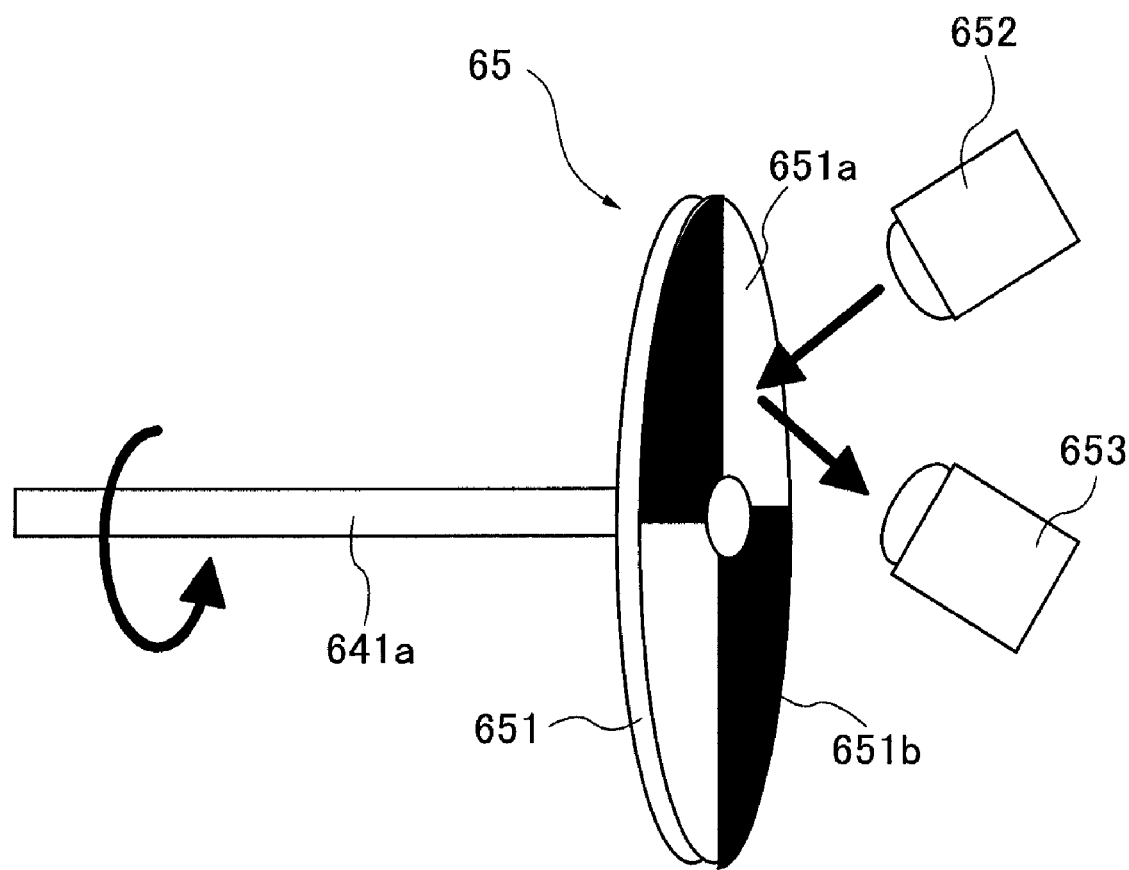
FIG. 10 is a view of a diagram illustrating a second rotation detection mechanism of the toner tank of the second embodiment.

As illustrated in FIG. 10, the second rotation detection mechanism 65 is a mechanism that detects rotation of the second water wheel 64, and includes a second disk 651, a second light-emitting member 652, and a second light-receiving member 653. The second disk 651 is disposed on the other end of the second rotary shaft 641a, and includes reflection portions 651a that are capable of reflecting light emitted by the second light-emitting member 652, and non-reflection portions 651b that are not capable of reflecting light. Each of the reflection portions 651a and the non-reflection portions 651b is formed in a shape obtained by dividing the second disk 651 into quarter sections in the circumferential direction. The reflection portions 651a and the non-reflection portions 651b are alternately disposed in the circumferential direction of the second disk 651. The second light-emitting member 652 is a member that is configured to emit light toward the second disk 651, and includes a LED. The second light-receiving member 653 is a member that is configured to receive light emitted by the second light-emitting member 652. The second light-receiving member 653 is disposed to be capable of receiving reflected light, that is, light that is emitted by the second light-emitting member 652 and is then reflected by the reflection portions 651a.

Figure 11:
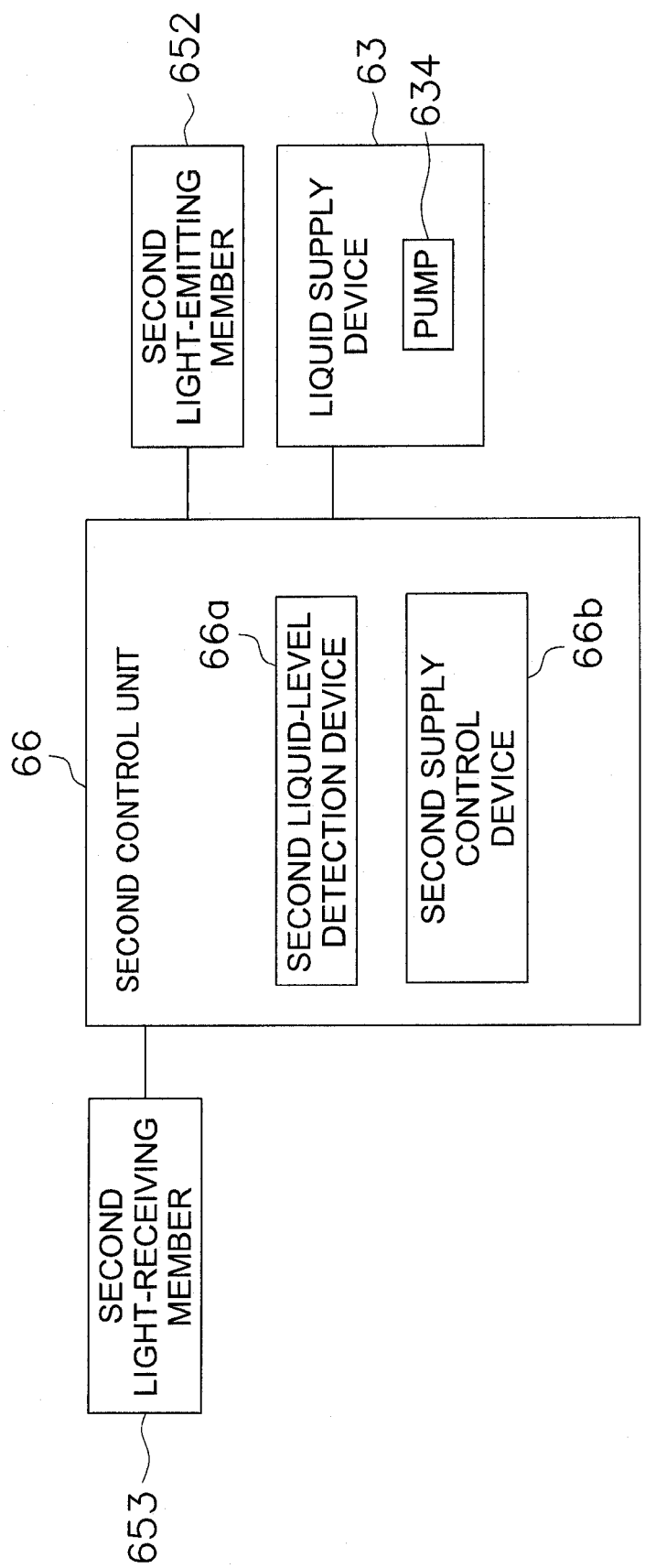
FIG. 11 is a view of a block diagram illustrating a second control unit of the toner tank of the second embodiment.

As illustrated in FIG. 11, the second control unit 66 is a unit that controls the pump 634, the second light-emitting member 652. The second control unit 66 is connected to the pump 634, the second light-emitting member 652, the second light-receiving member 653, and the like. In addition, the second control unit 66 includes a second liquid-level detection device 66a and a second supply control device 66b. The second liquid-level detection device 66a detects whether the liquid level of the liquid developer is positioned in a predetermined position by the light received by the second light-receiving member 653. The second supply control device 66b stops supply of the liquid developer from the liquid supply port 631 when the second liquid-level detection device 66a detects that the liquid level of the liquid developer is positioned in a predetermined position.

Specifically, it is possible to detect that the liquid level of the liquid developer is lower than a predetermined position when the second light-receiving member 653 is capable of intermittently receiving light emitted by the second light-emitting member 652 during the rotation of the second disk 651. On the other hand, it is possible to detect that the liquid level of the liquid developer is higher than or equal to predetermined height when the second light-receiving member 653 is not capable of continuously receiving light emitted by the second light-emitting member 652 for a predetermined period of time or more, or is capable of continuously receiving light emitted by the second light-emitting member 652 for a predetermined period of time or more.

In other words, the second rotary shaft 641a is not allowed to be rotated by the liquid developer supplied from the liquid supply port 631 under the condition that the liquid level of the liquid developer is higher than or equal to a predetermined height and at least a part of the second blade member 641b is positioned in the liquid developer. Accordingly, light emitted by the second light-emitting member 652 is not continuously received by the second light-receiving member 653 for a predetermined period of time or more under the condition that rotation of the second water wheel 64 is stopped while the non-reflection portion 651b is irradiated by the second light-emitting member 652. On the other hand, light emitted by the second light-emitting member 652 is continuously received by the second light-receiving member 653 for a predetermined period of time or more under the condition that rotation of the second water wheel 64 is stopped while the reflection portion 651a is irradiated by the second light-emitting member 652. Also, when the liquid level of the liquid developer is lower than a predetermined height, the second blade member 641b does not make contact with the liquid developer. Accordingly, the second blade member 641b is capable of rotating without being prevented from doing so by the liquid developer. Therefore, the liquid developer supplied from the liquid supply port 631 hits the second blade member 641b, and accordingly the second rotary shaft 641a is rotated. Consequently, the reflection portion 651a is intermittently irradiated by the second light-emitting member 652 and accordingly light emitted by the second light-emitting member 652 is intermittently received by the second light-receiving member 653. It is detected that the liquid level of the liquid developer reaches a predetermined height position by the rotation of the second water wheel 64.

2. Operation

An operation to detect a remaining amount of liquid developer stored in the toner tank TY will be hereinafter explained with reference to FIGS. 9-11. When the toner tank TY is installed in the image forming device for the first time, the interior of the toner tank TY is filled with the liquid developer. Then, the liquid developer is suctioned from the liquid suction port 632, and is supplied to the interior of the toner tank TY through the liquid supply port 631. Here, the interior of the toner tank TY is filled with the liquid developer. Accordingly, even when the liquid developer supplied through the liquid supply port 631 hits the second blade member 641b, the second water wheel 64 does not rotate. Due to this situation, light emitted by the second light-emitting member 652 is not intermittently received by the second light-receiving member 653. In other words, when the second light-emitting member 652 emits light toward the reflection portion 651a under the condition that the toner tank TY has been just installed, light emitted by the second light-emitting member 652 is always received by the second light-receiving member 653. On the other hand, when the second light-emitting member 652 emits light toward the non-reflection portion 651b under the condition that the toner tank TY has been just installed, light emitted by the second light-emitting member 652 is not received by the second light-receiving member 653.

When an image forming operation is started to be performed under this condition, the high-concentration developer is required for regulating the toner concentration of the liquid developer stored in the developer storing container 272. Accordingly, the toner stored in the toner tank TY is supplied to the developer storing container 272. Accordingly, the liquid developer stored in the toner tank TY is gradually reduced. Then, if the amount of the liquid developer reaches a predetermined amount (i.e., the amount for which exchange of the toner tank TY is required), the second rotary shaft 641a is rotated when the liquid developer supplied from the liquid supply port 631 hits the second blade member 641b. When the second disk 651 is rotated in accordance with the rotation of the second rotary shaft 641a, the second light-emitting member 652 alternately irradiates the reflection portion 651a and the non-reflection portion 651b, and the second light-receiving member 653 intermittently receives light emitted by the second light-emitting member 652. When light emitted by the second light-emitting member 652 is intermittently received by the second light-receiving member 653, it is judged that the amount of liquid developer in the toner tank TY has reached a predetermined amount. Then, an instruction to exchange the toner tank TY is displayed on a display unit (not illustrated in the figure) of the image forming device.

Here, even when the viscosity of the liquid developer is high, it is possible to know whether or not the amount of the liquid developer stored in the toner tank TY is reduced to a predetermined amount. Accordingly, it is possible to accurately inform a user of the timing of exchanging the toner tank TY.

Other Embodiments (a) In the above embodiments, a color printer is exemplified. However, the present invention is not limited to this, and may be applied to a photocopier, a MFP, and the like.

(b) In the above described embodiment, the color printer 1 in which photosensitive drums 10 are aligned in tandem type is used. However, the present invention is not limited to this, and other type of printer may be used.

(c) The liquid-level detection device of the present invention may be provided not only in the developer storing container 272 and the toner tank TY but also in the interior of the other liquid storing container. For example, the liquid-level detection device may be provided in the interior of the reserve tank 277 and the carrier tank CY of the above described first embodiment. In addition, the liquid-level detection device of the present invention is useful for detecting not only the liquid level of the liquid developer but also that of the other type of liquid, and may be provided in the interior of the liquid storing container that is configured to be included in devices excluding the image forming device.

(d) In the above described first embodiment, the first rotation detection mechanism 282 is used. However, the second rotation detection mechanism 65 may be used in the first embodiment. Also, the first rotation detection mechanism 282 may be used in the above described second embodiment.

(e) In the above described embodiment, it is detected that the liquid level of the liquid developer and the like reaches a predetermined height based on whether or not rotation of the first water wheel 281 and that of the second water wheel 64 are stopped. However, when the liquid level of the liquid developer and the like reaches a predetermined position, there is a chance that the rotation speed changes. Therefore, the liquid level of the liquid developer and the like may be configured to be detected by detecting the change of the rotation speed.

(f) In the above described second embodiment, detection of the liquid level may be configured to be performed by driving the pump 634 only for a predetermined period of time after the liquid developer is supplied to the developer storing container 272. With the configuration, it is possible to reduce useless power consumption. Furthermore, the second light-emitting member 652 may be caused to emit light only under the above situation.

(g) In the above described second embodiment, the reflection portion 651a and the non-reflection portion 651b are used. However, a high-reflection portion and a low-reflection portion may be provided instead of the reflection portion 651a and the non-reflection portion 651b. Here, the high-reflection portion is a portion having light reflectance higher than that of the low-reflection portion. In other words, the low-reflection portion is a portion having light reflectance lower than that of the high-reflection portion.

In this case, when the second rotary shaft 641a rotates, the second light-receiving member 653 receives light, intensity of which is alternately changed to be strong and weak. On the other hand, when rotation of the second rotary shaft 641a is stopped, the second light-receiving member 653 receives high-intensity constant light or low-intensity constant light.

(h) Emission of light by a light-emitting member may be configured to be performed for a specified period of time at predetermined intervals without being continuously performed.

GENERAL INTERPRETATION

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," and their derivatives. Also, the term "part," "section," "portion," "member," or "element" when used in the singular can have the dual meaning of a single part or a plurality of parts. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A liquid-level detection device being configured to detect that a liquid level in a liquid storing container is in a predetermined position, comprising:
a rotator disposed in the interior of the liquid storing container, the rotator being configured to be rotated by a liquid to be supplied to the liquid storing container, the rotator includes
a rotary shaft and a blade member;
the rotary shaft is rotatably attached to a wall of the liquid storing container, and
the blade member is formed to extend radially from the rotary shaft and is configured to be hit by liquid to be supplied to the liquid storing container;
a rotation detection mechanism detecting a rotation state of the rotator; and
a liquid-level detection device detecting whether liquid level in the liquid storing container is positioned in a predetermined position based on a result detected by the rotation detection mechanism, wherein
even when the liquid stored in the liquid storing container is not stirred, the liquid-level detection device detects whether the liquid level in the liquid storing container is positioned in a predetermined position.

2. The liquid-level detection device of claim 1, wherein the rotation detection mechanism includes
a disk attached to the rotary shaft, the disk having at least one slit for allowing light to pass through,
a light-emitting member configured to emit light toward the disk, and
a light-receiving member configured to receive light passing through the slit.

3. The liquid-level detection device of claim 1, wherein the rotation detection mechanism includes
a disk attached to the rotary shaft, the disk including at least one reflection part and at least one non-reflection part, the reflection part being configured to reflect light, the non-reflection part being disposed in the same radial position as the reflection part and configured not to reflect light,
a light-emitting member configured to emit light toward the disk, and
a light-receiving member configured to receive light reflected by the reflection part.

4. The liquid-level detection device of claim 1, wherein the rotation detection mechanism includes
a disk attached to the rotary shaft, the disk including at least one high-reflection part and at least one low-reflection part, the high-reflection part having a relatively high reflectance with respect to light, the low-reflection part being disposed in the same radial position as the high-reflection part and having a relatively low reflectance with respect to light,
a light-emitting member configured to emit light toward the radial position on the disk in which the high-reflection part and the low-reflection part are disposed, and a light-receiving member configured to receive light reflected by the high-reflection part and the low-reflection part.

5. The liquid-level detection device of claim 1, further comprising
a liquid supply part configured to supply liquid to the liquid storing container, and
a supply control device configured to stop supply of liquid from the liquid supply part when the liquid-level detection device detects that the liquid level is in a predetermined position.

6. The liquid-level detection device of claim 1, wherein
the liquid is liquid developer,
the liquid storing container includes a liquid outlet disposed in a bottom portion thereof, and
further comprising
a liquid supply part disposed in an upper portion of the liquid storing container and configured to supply liquid developer to the liquid storing container,
a liquid channel that connects the liquid outlet and the liquid supply part; and
a pump disposed in the liquid channel and configured to pump the liquid developer from the liquid outlet to the liquid supply part.

7. An image forming device, comprising:
an image forming section configured to form an image based on image information;
a liquid developer circulation device configured to recycle liquid developer used in the image forming section;
a liquid storing container disposed in the liquid developer circulation device and configured to store the liquid developer to be recycled; and
a liquid-level detection device including
a rotator disposed in the interior of the liquid storing container, and configured to be rotated by liquid to be supplied to the liquid storing container, the rotator includes
a rotary shaft rotatably attached to a wall of the liquid storing container, and
a blade member formed to extend radially from the rotary shaft and configured to be hit by liquid supplied to the liquid storing container,
a rotation detection mechanism detecting a rotation state of the rotator, and
a liquid-level detection device configured to detect whether a liquid level in the liquid storing container is positioned in a predetermined position based on a result detected by the rotation detection mechanism, wherein
even when the liquid stored in the liquid storing container is not stirred, the liquid-level detection device detects whether the liquid level in the liquid storing container is positioned in a predetermined position.

8. The image forming device of claim 7, wherein
the rotation detection mechanism includes
a disk attached to the rotary shaft and having at least one slit for allowing light to pass through,
a light-emitting member configured to emit light toward the disk, and
a light-receiving member configured to receive light passing through the slit.

9. The image forming device of claim 7, wherein
the rotation detection mechanism includes
a disk attached to the rotary shaft, the disk including at least one reflection part and at least one non-reflection part, the reflection part being configured to reflect light, the non-reflection part disposed in the same radial position as the reflection part and being configured not to reflect light,
a light-emitting member configured to emit light toward the disk, and
a light-receiving member configured to receive light reflected by the reflection part.

10. The image forming device of claim 7, wherein
the rotation detection mechanism includes
a disk attached to the rotary shaft, the disk including at least one high-reflection part and at least one low-reflection part, the high-reflection part having a relatively high reflectance with respect to light, the low-reflection part being disposed in the same radial position as the high-reflection part and having a relatively low reflectance with respect to light,
a light-emitting member configured to emit light toward the radial position on the disk in which the high-reflection part and the low-reflection part are disposed, and
a light-receiving member configured to receive light reflected by the high-reflection part and the low-reflection part.

11. The image forming device of claim 7, further comprising
a liquid supply part configured to supply liquid to the liquid storing container, and
a supply control device configured to stop supply of liquid from the liquid supply part when the liquid-level detection device detects that the liquid level is positioned in a predetermined position.

12. The image forming device of claim 7, wherein
the liquid is liquid developer,
the liquid storing container includes a liquid outlet disposed in a bottom portion thereof, and
further comprising
a liquid supply part disposed in an upper portion of the liquid storing container, the liquid supply part being configured to supply liquid developer to the liquid storing container,
a liquid channel connecting the liquid outlet and the liquid supply part, and
a pump disposed in the liquid channel, the pump being configured to pump the liquid developer from the liquid outlet to the liquid supply part.

13. A liquid containing device configured to store liquid, comprising:
a liquid storing container configured to store liquid;
a liquid supply part disposed on an upper portion of the liquid storing container;
a liquid outlet disposed on a bottom portion of the liquid storing container;
a liquid channel connecting the liquid outlet and the liquid supply part;
a pump disposed in the liquid channel and configured to pump the liquid developer in the liquid outlet to the liquid supply part;
a rotator disposed in the interior of the liquid storing container and rotated by liquid to be supplied to the liquid storing container from the liquid supply part, the rotator includes
a rotary shaft and a blade member;
the rotary shaft is rotatably attached to a wall of the liquid storing container, and
the blade member is formed to extend radially from the rotary shaft and is configured to be hit by liquid to be supplied to the liquid storing container;

a rotation detection mechanism detecting a rotation state of the rotator; and a liquid-level detection device detecting whether a liquid level in the liquid storing container is positioned in a predetermined position based on a result detected by the rotation detection mechanism, wherein even when the liquid stored in the liquid storing container is not stirred, the liquid-level detection device detects whether the liquid level in the liquid storing container is positioned in a predetermined position.

* * * * *